United States Patent Office 3,629,435
Patented Dec. 21, 1971

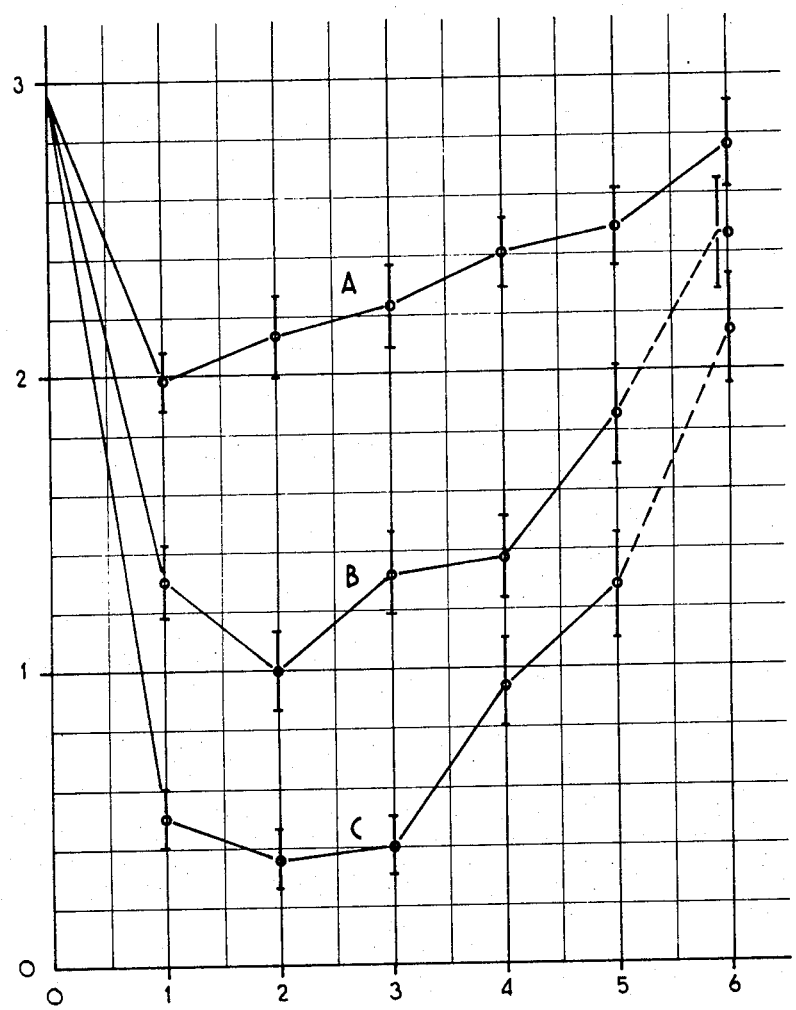

3,629,435
PHARMACEUTICAL COMPOSITIONS ACTING ON THE CENTRAL NERVOUS SYSTEM CONTAINING DISUBSTITUTED AMINOETHANOLS
Uberto Teotino, Davide Della Bella, and Vittorio Ferrari, Milan, Italy, assignors to Whitefin Holdings S.A., Lugano, Switzerland
Continuation-in-part of application Ser. No. 636,649, May 8, 1967. This application Aug. 8, 1969, Ser. No. 848,677
Int. Cl. A61u 27/00
U.S. Cl. 424—274
5 Claims

ABSTRACT OF THE DISCLOSURE

Compounds acting on the central nervous system, having the formula:

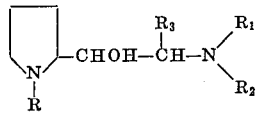

wherein R is selected in the group comprising alkyl, aryl and arylalkyl groups which may be substituted by at least one radical selected in the group comprising halogen atoms, alkyl, hydroxy, alkoxy, trifluoromethyl, nitro, amino, mono- or di-alkylamino radicals; $R_1$ is selected in the group comprising alkyl and cycloalkyl radicals; $R_2$ is an alkyl, or taken together with $R_1$ and the nitrogen atom to which they are attached is a heterocyclic ring which may include a further hetero atom; $R_3$ is selected in the group comprising a hydrogen atom and alkyl radicals and their salts with organic and inorganic acids and alkyl halides.

---

This application is a continuation-in-part of copending application Ser. No. 636,649, filed May 8, 1967, now Pat. No. 3,539,589.

This invention relates to N,N-disubstituted pyrrilaminoethanols having the formula:

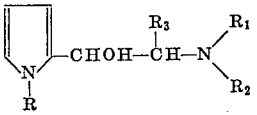

wherein
R is an alkyl, aryl or arylalkyl group which may be substituted by one or more halogen atoms, alkyl, hydroxy, alkoxy, trifluoromethyl, nitro, mono- or di-alkylamino radicals,
$R_1$ is an alkyl or cycloalkyl radical,
$R_2$ is an alkyl, or arylalkyl group, or taken together with $R_1$ and the nitrogen atom to which they are attached, is a heterocyclic ring which may include a further hetero atom, and
$R_3$ is a hydrogen atom or an alkyl radical, and their salts with organic and inorganic acids and alkyl halides.

This invention includes pharmaceutical preparation containing the disubstituted aminoethanols of this invention or their physiologically tolerable salts with acids or alkyl halides in admixture or conjunction with a pharmaceutically acceptable carrier or diluent.

The disubstituted aminoethanols of this invention can be prepared according to this invention by reducing a compound of the formula:

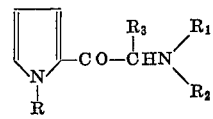

wherein R, $R_1$, $R_2$ and $R_3$ have the meanings given above. The reduction is preferably carried out in the presence of an inert solvent with a reducing agent such as lithium aluminium hydride, sodium borohydride or aluminium isopropoxide at a temperature of from 0° to 90° C. for a period of from 2 to 60 hours. This method is particularly useful for reducing the keto-group only, when there are present in the molecule other groups which may be affected by hydrogenation.

The starting materials of the Formula II may be prepared according to the processes disclosed in our patent application Ser. No. 636,643 filed May 8, 1967.

The acid addition salts of the new compounds of this invention can be prepared in the usual manner, that is by reacting the disubstituted aminoethanols with either the stoichiometric amount of organic or inorganic acid in water or in a water-miscible solvent, such as acetone or ethanol, with isolation of the salt by concentration and cooling or an excess of the acid in water-immiscible solvent, such as diethyl ether or chloroform, with the desired salt separating directly. Exemplary of such organic salts are those with maleic, fumaric, benzoic, ascorbic, succinic, methanesulphonic, benzenesulphonic and hydroxy-benzoic acids. The preferred salts of this invention are those with aromatic hydroxy-carboxilic acids as p-hydroxybenzoic, gentisic, galic, protocatechuic, and β-resorcylic acid. Exemplary of such inorganic salts are these with hydrochloric, hydrobromic and sulphuric acids. The quaternary ammonium salts of this invention can be prepared by reacting a disubstituted aminoethanol of the general Formula I with a lower alkyl halide, such as methyl bromide or methyl iodide.

The new compounds of this invention exhibit significant properties on the central nervous system. Particularly marked are the sedative and analgesic effects on the CNS. The analgesic activity has been tested in mice by the hotplate test and by the stretching by injection of acetic acid. With regard to last test the $ED_{50}$ values in mice for example of 1-a-(N-o-chlorobenzyl)-pyrryl-2-disec. butylaminoethanol are 0.7 mg./100 g. subcutaneously and 1.5 mg./100 g. orally. By the oral route 1-a-(N-o-chlorobenzyl)-pyrryl-2-disec. butylaminoethanol is three times more potent than codeine, nine times than aminopyrine and twelve times than acetylsalicyclic acid. The peak analgesia occurs in 60 minutes, but the effect is marked also four hours after drug administration. Values closely similar have been found with all the compounds indicated under Example 1.

The study of the sedative activity has been carried out by testing:

(a) the behaviour of animals treated with the new compounds of this invention; it was noted reduction of motility and lessened reactivity.
(b) the influence of the effects of subhypnotic and hypnotic doses of barbiturates.

(c) the sedative effect on the cough centre previously excited by an ammoniacal aerosol in rat and by electrical stimulation of the superior laryngeal nerve in decerebrate cat. According to the last test the ED values intraperitoneally are of from 8 to 20 mg./kg. in rat and from 5 to 10 mg./kg. in cat.

The compounds of this invention have shown a very low toxicity: $LD_{50}$ values higher than 100 mg./kg. by the intraperitoneal route in mice; higher than 400 mg./kg. by the oral route in mice and rat. A daily administration of 100 mg./kg. by the oral route in mice and rat for three months is well tolerated. The examination of the tissues following slaughter did not reveal evidence of pathological changes and the hematologic values found were uneffected.

The compounds of this invention can be administered orally, subcutaneously or intravenously in any pharmaceutical form suitable for these administration routes.

An exemplary capsule suitable for oral administration has the following composition:

| | Mg. |
|---|---|
| 1-a-(N-o-chlorobenzyl)-pyrryl - 2-disec.butylaminoethanol p-hydroxybenzoate | 41.5 |
| Talcum | 3 |
| Dibasic calcium phosphate | 63.5 |
| Magnesium stearate | 2 |

124.5 g. of 1-a-(N-o-chlorobenzyl) - 2 - disec.-butylaminethanol p.hydroxybenzoate, 9 g. of talcum, 190.5 g. of dibasic calcium phosphate and 6 g. of magnesium stearate are mixed and sieved twice through an 80 mesh sieve. The mixture is transferred into a mixer and allowed to turn for 15 minutes. With this mixture are filled 3000 No. 4 natural hard gelatine capsules.

The outstanding pharmalogical properties and safety characteristics have been ascertained also in humans by the following

CLINICAL TRIALS

Preparations used: capsules of identical appearance, with the following designations and compositions:

Preparation A

| | Mg. |
|---|---|
| Dibasic calcium phosphate | 107 |
| Talcum | 1.5 |
| Magnesium stearate | 1.5 |

Preparation B

| | Mg. |
|---|---|
| 1 - [a-(N-o-chlorobenzyl)-pyrryl] - 2 - disecbutylaminoethanol p-hydroxybenzoate (equivalent to 30 mg. of the base) | 41.5 |
| Dibasic calcium phosphate | 63.5 |
| Talcum | 3 |
| Magnesium stearate | 2 |

Preparation C

| | Mg. |
|---|---|
| Codeine hydrochloride | 30 |
| Starch dried | 113 |
| Talcum | 5 |

Subjects

These were 71 in-patients with various painful conditions and are described in Table 1 and Table 2.

TABLE 1.—I SERIES (SINGLE DOSES)
Study patients and groups of painful conditions

| Group of disorders | No. rounds over No. cases | Sex M | Sex F | Age Mean | Age Range | Site of pain or clinical condition | No. cases | No. rounds |
|---|---|---|---|---|---|---|---|---|
| Skeletal and articular | 10/10 | 2 | 8 | 64 | 46–78 | Osteocarthritis | 3 | 3 |
| | | | | | | Rheumatoid arthritis | 2 | 2 |
| | | | | | | Rheumatic fever | 1 | 1 |
| | | | | | | Ostecporosis | 3 | 3 |
| | | | | | | Sudeck atrophy | 1 | 1 |
| Neural | 10/ 9 | 3 | 6 | 64 | 42–76 | Ischialgia | 4 | 5 |
| | | | | | | Occipital neuritis | 2 | 2 |
| | | | | | | Brachial neuritis | 1 | 1 |
| | | | | | | Diabetic neuritis, legs | 2 | 2 |
| Visceral | 15/14 | 4 | 10 | 56 | 36–77 | Pleural pain | 5 | 5 |
| | | | | | | Chest pain, other etiol | 7 | 8 |
| | | | | | | Hepatomegaly | 1 | 1 |
| | | | | | | Intestinal pain | 1 | 1 |
| Neoplastic | 11/ 5 | 3 | 2 | 56 | 44–70 | Lung cancer, metast. to bone or liver | 3 | 7 |
| | | | | | | Malignant haemopathies | 2 | 4 |
| Obstructive arterial | 5/ 3 | 3 | 0 | 71 | 58–84 | Leg ischaemia (1 gangrene) | 3 | 5 |
| Headache | 3/ 3 | 1 | 2 | 71 | 67–74 | (Cerebrovascular etiology) | 3 | 3 |
| Total | 54/44 | 16 | 28 | 62 | 36–84 | | | |

TABLE 2.—II SERIES (REPEATED DOSES)
Study patients and groups of painful conditions

| Group of disorders | No. rounds over No. cases | Sex M | Sex F | Age Mean | Age Range | Site of pain or clinical conditions | No. cases | No. rounds |
|---|---|---|---|---|---|---|---|---|
| Skeletal, articular and neural | 16/14 | 3 | 11 | 60 | 39–79 | Osteocarthritis | 2 | 2 |
| | | | | | | Id. with ischialgia | 6 | 7 |
| | | | | | | Id. with other neuralgias | 3 | 3 |
| | | | | | | Tabes with ischialgia | 1 | 1 |
| | | | | | | Epulis | 1 | 2 |
| | | | | | | Intercostal neuritis | 1 | 1 |
| Visceral | 4/ 4 | 0 | 4 | 51 | 21–74 | Chest: Pleuritis | 1 | 1 |
| | | | | | | Pericarditis | 1 | 1 |
| | | | | | | Sarcoidosis | 1 | 1 |
| | | | | | | Abdominal (pancreatitis) | 1 | 1 |
| Neoplastic | 5/ 4 | 1 | 3 | 55 | 26–73 | Colon cancer (met. bone or lung) | 2 | 3 |
| | | | | | | Breast cancer (pleural invasion) | 1 | 1 |
| | | | | | | Hodgkin disease | 1 | 1 |
| Obstructive arterial | 4/ 2 | 0 | 2 | 76, 77 | | Leg ischaemia (1 gangrene) | 2 | 4 |
| Headache | 3/ 3 | 0 | 3 | 41 | 19–67 | Cerebrovascular | 2 | 2 |
| | | | | | | Sinusitis | 1 | 1 |
| Total | 32/27 | 4 | 23 | 57 | 19–79 | | | |

Methods

I Series: Each subject received single doses (2 capsules) of all the 3 preparations, in randomized order, on 3 consecutive mornings (usually at 8 a.m. or earlier). The procedure was double-blind.

Only the patients who went through the complete comparison of the 3 treatments (a "round") are considered. There were 54 rounds completed in 43 patients (Table 1).

Standard questioning for pain intensity was done just before the administration of the dose and at hourly intervals thereafter for 5 or 6 hours. Pain intensity scores used were:

0 no pain
1 slight pain
2 moderate pain
3 severe pain

These were recorded on the clinical form after each questioning.

No other analgesic medication was allowed for at least 3 hours pre-treatment. If the pain intensity score (usually 3 at the beginning) remained unchanged up to 3 hr. post-medication, other analgesics were allowed and the same score was assigned for the subsequent hourly ratings.

II Series: Each subject received 6 capsules of all the 3 preparations in 3 administrations of 2 capsules each at 9 a.m. (or when the pain became severe between 8 and 10 a.m.), at 2 p.m. and at 8 p.m. of 3 consecutive days. The order was randomized.

There were 32 rounds completed in 27 patients and all these patients were other than those of the I Series. The procedure was double-blind, but the daily treatments were not individually coded.

Six ratings of pain intensity were assigned over each day using the pain intensity scores described for the I Series (one at start, two after the 1st and 2nd dose and one after the evening dose). The post-medication scores of each daily period were combined to form 3 classes of daily pain relief:

Complete: all post-medication pain intensity scores=0, with only a single score 1 permitted.
Partial: ratings included between the above and a maximum of all scores 1 with only a single score 2 permitted.
Unsatisfactory: any other.

The sum of the Complete+Partial reliefs as used here practically gives the class of "50% or more relief" frequently used in studies of this kind.

Results

I Series: Hourly pain intensity scores are set out in FIG. 1. In the whole group of observations (FIG. 1), B is significantly better than A but less active than C at the tested doses. Total pain intensity scores (Table 3) illustrate the same phenomenon. On considering the different groups of pain (Table 3), there are indications that B performs relatively better, and approaches C, in cases of neural and obstructive arterial pain.

II Series: In Table 4 the frequency of the classes of daily pain reliefs observed with the 3 treatments are reported. Over 32 rounds, there were 13 (41%) Complete+Partial reliefs with A, 25 (78%) with B and 12 (38%) with C. Statistical analysis indicates a significant difference between the results, which is obviously due to B.

The results of this experiment have been analyzed also in a way that allowed for more suitable differences to be shown up, i.e. by ranking the treatments in each round according to the mere sum of the scores totalled by each in that round. This representation is given in Table 5 and the statistical analysis shows that B on repeated administrations was clearly superior to A and to C. Codeine itself in this experiment was not different from Placebo.

There were 25 preferences expressed by the patients over 32 rounds: 1 for A, 3 for C and 21 for B. Requests of further supplies of the study preparations were made by 9 patients: 1 for A, 2 for C and 6 for B.

TABLE 3.—I SERIES (SINGLE DOSES)

Analgesic activity

| Group of disorders | Rounds No. | Total pain intensity scores [1] (means) | | | Ranks (means) | | |
|---|---|---|---|---|---|---|---|
| | | B | C | A | B | C | A |
| Skeletal and articular | 10 | 8.4 | 3.0 | 10.7 | 2.10 | 1.45 | 2.45 |
| Neural | 10 | 5.5 | 6.1 | 10.4 | 1.70 | 1.80 | 2.50 |
| Visceral | 15 | 5.9 | 1.3 | 11.7 | 1.97 | 1.27 | 2.77 |
| Neoplastic | 11 | 8.6 | 4.2 | 11.5 | 2.05 | 1.32 | 2.64 |
| Obstructive arterial | 5 | 5.4 | 4.8 | 10.8 | 1.40 | 1.60 | 3.00 |
| Headache | 3 | 6.3 | 2.7 | 13.0 | 1.67 | 1.33 | 3.00 |
| Total (±s.e.) | 54 | 6.8 (±.65) | 3.5 (±.)48 | 11.2 (±.53) | 1.89 | 1.44 | 2.67 |

[1] Sum of the 5 post medications hourly scores.

NOTE: Statistical analysis of ranks (see ref. to Table 1):
Overall (Friedman Test): $X^2 = 41.33$ ($P<0.001$)
Pairs (Wilcoxon Test):
 B vs A—Z=−5.00 ($P <0.001$)
 C vs A—Z=−5.77 ($P <0.001$)
 B vs C—Z=−3.51 ($P <0.001$);

TABLE 4.—II SERIES (REPEATED DOSES)

Analgesic activity

| Group of disorders | Class of daily pain relief | Frequency distribution | | |
|---|---|---|---|---|
| | | B | C | A |
| Skeletal, articular and neural | Complete | 7 | 1 | 3 |
| | Partial | 5 | 6 | 6 |
| | Unsatisfactory | 4 | 9 | 7 |
| Visceral | Complete | 2 | 0 | 1 |
| | Partial | 0 | 1 | 1 |
| | Unsatisfactory | 2 | 2 | 3 |
| Neoplastic | Complete | 2 | 2 | 0 |
| | Partial | 3 | 0 | 0 |
| | Unsatisfactory | 0 | 3 | 5 |
| Obstructive arterial | Complete | 3 | 0 | 2 |
| | Partial | 0 | 0 | 0 |
| | Unsatisfactory | 1 | 4 | 2 |
| Headache | Complete | 2 | 0 | 0 |
| | Partial | 1 | 1 | 1 |
| | Unsatisfactory | 0 | 2 | 2 |
| Total | Complete | 16 }78% | 4 }38% | 5 }41% |
| | Partial | 9 | 8 | 8 |
| | Unsatisfactory | 7 | 20 | 19 |

NOTE: Statistical analysis (2×3 contingency table; complete plus partial vs. unsatisfactory: $X^2 = 13.36$ ($P<0.01$).

TABLE 5.—II SERIES (REPEATED DOSES)

Analgesic activity

| Group of disorders | Rounds No. | Ranks (means) | | |
|---|---|---|---|---|
| | | B | C | A |
| Skeletal, articular and neural | 16 | 1.25 | 2.47 | 2.28 |
| Visceral | 4 | 1.37 | 2.25 | 2.37 |
| Neoplastic | 5 | 1.20 | 2.00 | 2.80 |
| Obstructive arterial | 4 | 1.37 | 2.62 | 2.00 |
| Headache | 3 | 1.00 | 2.17 | 2.83 |
| Total | 32 | 1.25 | 2.36 | 2.39 |

NOTE: Statistical analysis of Ranks (see ref. to Table 1):
Overall (Friedman Test): $X_r^2 = 27.02$ ($P<0.001$)
Pairs (Sign Test):
B vs. A; Z=4.23; ($P<0.001$)
C vs. A; Z=0.20; ($P=0.84$)
B vs. C; Z=4.62; ($P<0.001$).

The relatively high frequency of disturbing side effects with C at these doses should also be considered, but no definite inverse relation between side effects and pain relief was appearent from the data.

Side effects

These are summarized in Table 6. On repeated administrations of C there was a high rate (37.5%) of nausea+vomiting (usually occurring at night, i.e. after the 3rd dose).

The rate of these disturbances with B appears to be very definitely lower, and meaningful figures of incidence will have to be derived from larger samples.

No psychomimetic or other clinically apparent actions were associated with B.

Laboratory investigations have been performed for patients of the II Series and no discernible changes in blood, urine and liver function tests were noted.

TABLE 6.—SIDE EFFECTS REPORTED BY STUDY PATIENTS OF THE I AND II SERIES

| Side effect | Single doses (54 rounds) | | | Repeated doses (32 rounds) | | |
|---|---|---|---|---|---|---|
| | B | C | A | B | C | A |
| Pyrosis | 2 | 1 | 2 | | 1 | |
| Nausea | | | | 2 | 7 | |
| Vomiting | 1 | | | | 5 | |
| Sedation | 1 | 2 | 1 | | | 2 |
| Feels warm | 3 | 2 | 1 | | | |
| Dizziness | 1 | | | | | |

The following examples illustrate the manner of obtaining the new compounds of the invention as well as their physical characteristics.

EXAMPLE I 5.4 g. (0.022 mol.) of 1-benzyl-2-dimethylaminoacetylpyrrole and 40 ml. of methyl alcohol are placed in a 100 ml. four necked flask fitted with a stirrer, a dropping funnel, a reflux condenser nad a thermometer. The solution is stirred and a mixture of 1.7 g. (0.044 mol.) of sodium borohydride in 4 ml. of water is added slowly through the dropping funnel at such a rate that the solvent refluxes gently without external heating. When the addition is complete and the initial reaction subsides, the mixture is stirred and heated at gentle reflux for six hours. The solvents are distilled off under reduced pressure and the residue is suspended in water and shaken with diethyl ether. The other extract is dried over anhydrous magnesium sulphate, the solvent is removed by evaporation under reduced pressure and the oily residue is fractionated. Yield 4.9 g.; B.P. 120° C./0.4 mm. Hg.

By analogous procedures the following compounds have been prepared:

1-[a-(N-benzyl)-pyrryl]-2-diethylaminoethanol, B.P.=143–145° C./0.5 mm. Hg

1-[a-(N-benzyl)-pyrryl]-2-dipropylaminoethanol, B.P.=160–165° C./0.4 mm. Hg

1-[a-(N-benzyl)-pyrryl]-2-diisopropylaminoethanol, B.P.=155–160° C./0.4 mm. Hg

1-[a-(N-benzyl)-pyrryl]-2-dibutylaminoethanol, B.P.=158–163° C./0.4 mm. Hg

1-[a-(N-benzyl)-pyrryl]-2-disec.butylaminoethanol, B.P.=150–155° C./0.4 mm. Hg

1-[a-(N-benzyl)-pyrryl]-2-pyrrolidinoethanol, B.P.=148–153° C./0.4 mm. Hg

1-[a-(N-benzyl)-pyrryl]-2-piperidinoethanol, M.P.=50–52° C.

1-[a-(N-benzyl)-pyrryl]-2-morphelinoethanol, M.P.=44–47° C.

1-[a-(N-benzyl)-pyrryl]-2-(N'benzyl-N'-methyl)-aminoethanol, B.P.=195–200° C./0.2 mm. Hg 1-[a-(N-benzyl)-pyrryl]-2-N'-benzyl-N'-terbutyl)-aminoethanol, M.P.=123–125° C.

1-[a-(N-methyl)-pyrryl]-2-pyrrolidinoethanol, M.P.=35–46° C.

1-[a-(N-methyl)-pyrryl]-2-piperidinoethanol, M.P.=53–54° C.

1-[a-(N-phenyl)-pyrryl]-2-diethylaminoethanol, B.P.=140–143° C./0.3 mm. Hg

1-[a-(N-phenyl)-pyrryl]-2-desec.butylaminoethanol, B.P.=135–140° C. 0.3 mm. Hg

1-[a-(N-benzyl)-pyrryl]-2-diiso.butylaminoethanol, B.P.=160–165° C. 0.4 mm. Hg

1-[a-(N-phenyl)-pyrryl]-2-pyrrolidinoethanol, B.P.=145–150° C./0.1–0.2 mm. Hg

1-[a-(N-phenyl)-pyrryl]-2-pyrrolidinoethanol, hydrochl., M.P.=119–121° C.

1-[a-(N-phenyl)-pyrryl]-2-piperidinoethanol, B.P.=155–160° C./0.1 mm. Hg

1-[a-(N-phenyl)-pyrryl]-2-piperidinoethanol hydrochl., M.P.=140–142° C. (dec.)

1-[a-N-o-chlorobenzyl) pyrryl]-2-diethylaminoethanol, B.P.=150–155° C./0.2 mm. Hg 1-[a-(N-o-chlorobenzyl)-pyrryl]-2-disec.butyl-aminoethanon, B.P.=160–165° C./0.1 mm. Hg 1-[a-(N-o-chloobenzyl)-pyrryl]-2-disec.butyl-aminoethanol p-hydroxybenzoate, M.P.=128–130° C. (dec.)

1-[a-(N-o-chlorobenzyl)-pyrryl]-2-disec.butyl-aminoethanol a-resorcylate, M.P.=91–94° C. (dec.)

1-[a-(N-o-chlorobenzyl)-pyrryl]-2-disec.butyl-aminoethanol protecaechuicate, M.P.=60–70° C. (dec.)

1-[a-(N-o-chlorobenzyl)-pyrryl]-2-pyrrolidino-ethanol, B.P.=150–155° C./0.1 mm. Hg 1-[a-(N-o-chlorobenzyl)-pyrryl]-2-pyrrolidino-ethanol hydrochloride, M.P.=137–138° C.

1-[a-(N-benzyl)-pyrryl]-2-diethylaminopropanol hydrochl., M.P.=140–142° C. (dec.)

1-[a-(N-benzyl)-pyrryl]-2-pyrrolidinopropanol, B.P.=135–140° C./0.1–0.2 mm. Hg

1-[a-(N-benzyl)-pyrryl]-2-pyrrolidinopropanol hydrochl., M.P.=140–142° C.

1-[a-(N-benzyl)-pyrryl]-2-piperidinopropanol, B.P.=150–153° C./0.1–0.2 mm. Hg

1-[a-(N-p-chlorobenzyl)-pyrryl]-2-diethylamino-ethanol, B.P.=160–165° C./0.1 mm. Hg 1-[a-(N-p-chlorobenzyl)-pyrryl]-2-disec.butyl-aminoethanol, B.P.=160–165° C./0.3 mm. Hg 1-[a-(N-p-chlorobenzyl)-pyrryl]-2-piperidinoethanol, B.P.=155–160° C./0.1 mm. Hg 1-[a-(N-p-chlorobenzyl)-pyrryl]-2-piperidinoethanol hydrochloride, M.P.=134–135° C.

1-[a-(N-p-chlorobenzyl)-pyrryl]-2-pyrrolidino-ethanol, B.P.=145–155° C./0.1–0.2 mm. Hg 1-[a-(N-p-chlorobenzyl)-pyrryl]-2-pyrrolidino-ethanol hydrochloride, M.P.=121–122° C.

1-[a-(N-o-chlorobenzyl)-pyrryl]-2-disec.butyl-aminoethanol-resorcylate, M.P.=72–74° C. (dec.)

1-[a-(N-o-chlorobenzyl)pyrryl]-2-piperidino-ethanol, B.P.=140–142° C./0.1 mm. Hg 1-[a-(N-o-chlorobenzyl)pyrryl]-2-piperidino-ethanol hydrochloride, M.P.=125–126° C.

1-[a-(N-ethyl)-pyrryl]-2-diethylaminoethanol, B.P.=94–96° C./0.4 mm. Hg

1-[a-(N-benzyl)-pyrryl]-2-(N'-benzyl-N'-ethyl)-
 aminoethanol, B.P.=195–200° C./0.2 mm. Hg
1-[a-(N-ethyl)-pyrryl]-2-piperidinoethanol,
 B.P.=105–110° C./0.15 mm. Hg
1-[a-(N-ethyl)-pyrryl]-2-disec. butylaminoethanol,
 B.P.=100–105° C./0.2 mm. Hg
1-[a-(N-methyl)-pyrryl]-2-diethylaminoethanol,
 B.P.=90–95° C./0.3 mm. Hg
1-[a-(N-methyl)-pyrryl]-2-diethylaminoethanol
 p.hydroxybenzoate, M.P.=136–137° C. (dec.)
1-[a-(N-p-methoxybenzyl)-pyrryl]-2-piperidino-
 ethanol, B.P.=175–185° C./0.3 mm. Hg
1-[a-(N-p-methoxybenzyl)-pyrryl]-2-piperidino-
 ethanol oxalate, M.P.=114–115° C. (dec.)
1-[a-(N-2.6-xylyl)-pyrryl]-2-pyrrolidinoethanol,
 B.P.=150–160° C./0.2 mm. Hg
1-[a-(N-2.6-xylyl)-pyrryl]-2-pyrrolidinoethanol
 oxalate, M.P.=174–175° C.
1-[a-(N-p-bromobenzyl)-pyrryl]-2-pyrrolidino-
 ethanol, B.P.=160–170° C./0.4 mm. Hg
1-[a-(N-p-bromobenzyl)-pyrryl]-2-pyrrolidino-
 ethanol picrate, M.P.=131–132° C.
1-[a-(N-2.6-xylyl)-pyrryl]-2-piperidinoethanol,
 B.P.=165–170° C./2 mm. Hg
1-[a-(N-2.6-xylyl)-pyrryl]-2-piperidinoethanol
 oxalate, M.P.=163–164° C. (dec.)
1-[a-(N-ethyl)-pyrryl]-2-pyrrolidinoethanol,
 B.P.=115–125° C./0.5 mm. Hg
1-[a-(N-ethyl)-pyrryl]-2-pyrrolidinoethanol
 p.hydroxybenzoate, M.P.=145–147° C. (dec.)

EXAMPLE 11

10 g. (0.0278 mol) of 1-(o-chloro)-benzyl-2-disec. butylaminoacetylpirrole and 300 ml. of anhydrous di-ethyl ether are placed in a 500 ml. four necked flask with a mercury-sealed stirrer, a thermometer, a dropping funnel and a reflux condenser topped with a tube containing anhydrous calcium chloride. The solution is stirred and a mixture of 1 g. (0.0264 mol) of lithium aluminium hydride in 20 ml. of di-ethyl ether is added slowly through the dropping funnel at such a rate that the solvent refluxes gently without external heating. When the addition is complete and the initial reaction subsides, the mixture is stirred and heated at gentle reflux for two hours.

The mixture is cooled and the excess of lithium aluminium hydride is decomposed with cracked ice. The water layer is separated and washed with diethyl ether. The combined ether extracts are dried over anhydrous magnesium sulphate and the solvent is removed by distillation under reduced pressure.

Yield: 8.8 g.; B.P.=160–165° C./0.1 mm. Hg.

We claim:

1. A pharmaceutical composition acting on the central nervous system comprising an effective amount of a compound of the formula

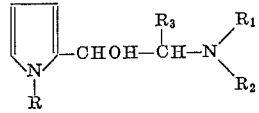

wherein R is selected from the group consisting of lower alkyl, phenyl and benzyl which may contain one or two substituents selected from the group consisting of halogen, lower alkyl, and lower alkoxy; $R_1$ is selected from the group consisting of alkyl with 1–4 carbon atoms; $R_2$ is selected from the group consisting of alkyl with 1–4 carbon atoms or taken together with $R_1$ and the nitrogen atom to which they are attached is a heterocyclic ring selected from the group consisting of piperidinyl, pyrrolidinyl and morpholinyl; and $R_3$ is hydrogen or methyl, or its pharmaceutically acceptable salts with organic acids, inorganic acids and alkyl halides.

2. A pharmaceutical composition according to claim 1 wherein R is selected from the group consisting of phenyl, benzyl and benzyl substituted with one or two substituents selected from the group consisting of halogen, lower alkyl and lower alkoxy; and $R_2$ taken with $R_1$ and the nitrogen atom to which they are attached is a heterocyclic ring selected from the group consisting of piperidinyl, pyrrolidinyl and morpholinyl.

3. A pharmaceutical composition according to claim 1 wherein R is benzyl or a mono-halogen substituted benzyl.

4. A pharmaceutical composition according to claim 3 wherein $R_1$ and $R_2$ are each a lower alkyl.

5. A pharmaceutical composition according to claim 4 wherein R is chlorobenzyl, $R_1$ and $R_2$ are each butyl and $R_3$ is hydrogen.

References Cited

Fritz: Chemical Abstracts (1964), vol. 60, p. 6815 c.

STANLEY J. FRIEDMAN, Primary Examiner

U.S. Cl. X.R.

424—248, 267